July 17, 1951     E. L. GAMBETTA     2,560,857
APPARATUS FOR MEASURING ELECTROCHEMICAL POTENTIALS
Filed June 11, 1946     3 Sheets-Sheet 1
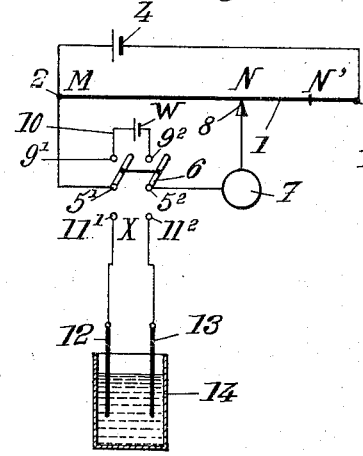
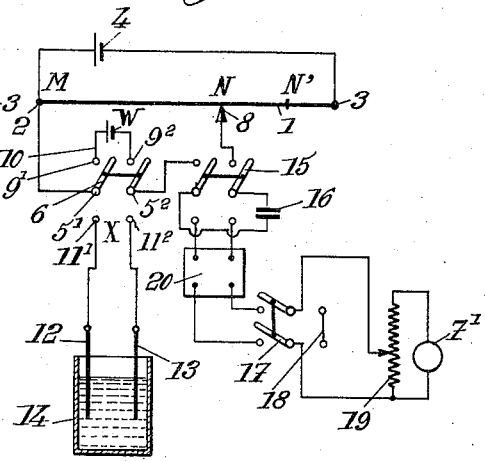
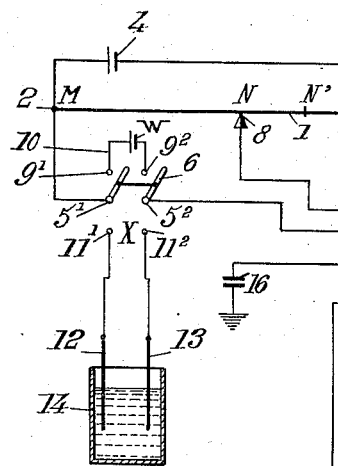
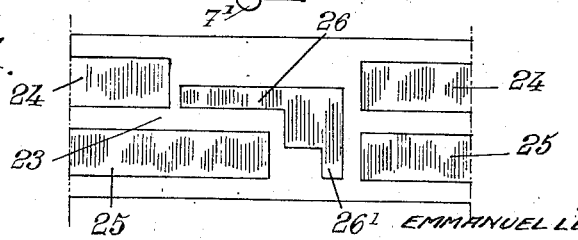
INVENTOR
EMMANUEL LEON GAMBETTA
BY Robert B. Larson
ATTORNEY INVENTOR
EMMANUEL LEON GAMBETTA,
BY
Robert B Pearson
ATTORNEY July 17, 1951  E. L. GAMBETTA  2,560,857
APPARATUS FOR MEASURING ELECTROCHEMICAL POTENTIALS
Filed June 11, 1946  3 Sheets-Sheet 3
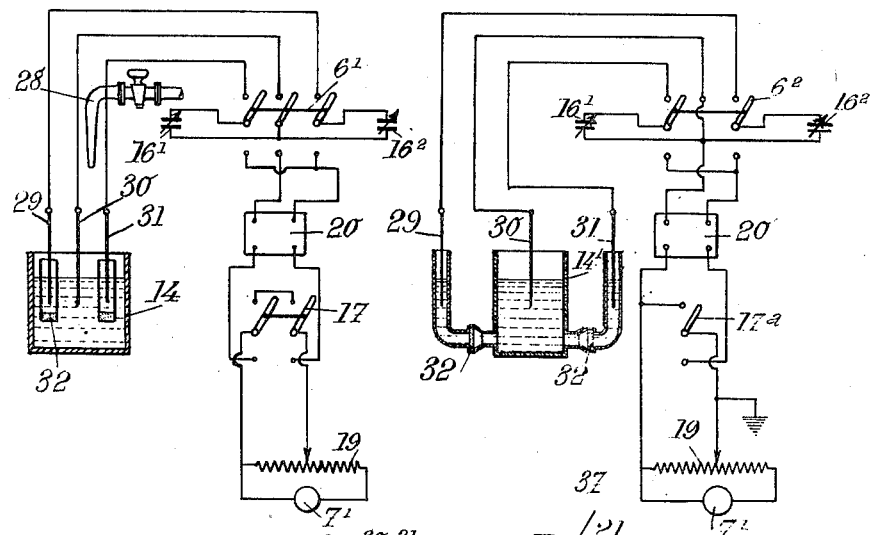
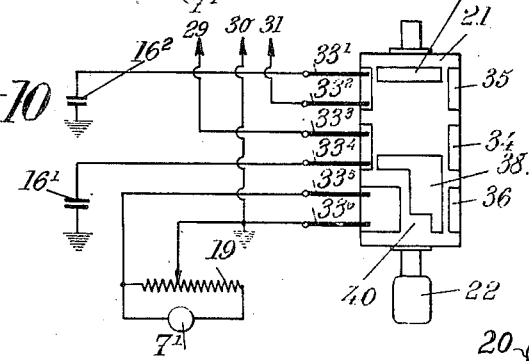
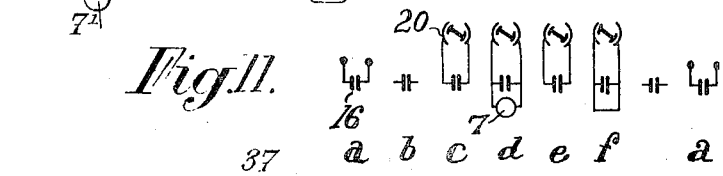
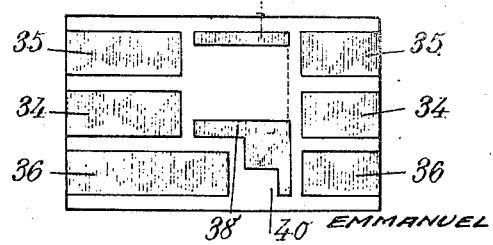
INVENTOR
EMMANUEL LEON GAMBETTA,
BY Robert B Pearson
ATTORNEY Patented July 17, 1951

2,560,857

UNITED STATES PATENT OFFICE 2,560,857

APPARATUS FOR MEASURING ELECTROCHEMICAL POTENTIALS

Emmanuel Léon Gambetta, Saint-Mande, France, assignor to Giodvad Grell, New York, N. Y.

Application June 11, 1946, Serial No. 675,846
In France June 13, 1945

6 Claims. (Cl. 175—183)

The present invention relates to methods and devices for measuring or checking potential differences on the zero method principle, and it is more especially, although not exclusively concerned, among these methods and apparatus, with those relating to physico-chemical potentiometry and other fields of application in which small potential differences are brought into play.

Its object is to provide a method and device of this kind which are better adapted to meet the requirements of practice than those used for the same purposes up to the present time and in particular which are simpler, more sensitive and more accurate, while reducing and simplifying the operations to be performed for obtaining the desired measurements.

Other objects of my invention will result from the following detailed description of some specific embodiments thereof with reference to the accompanying drawings, given merely by way of example, and in which:

Fig. 1 is a diagrammatical view of an apparatus of the kind with which the invention is concerned, made according to the prior art;

Fig. 2 is a similar view of an apparatus of this kind made according to my invention for determining the value of a fixed potential X;

Fig. 3 is a diagrammatical view of a practical embodiment of such an apparatus;

Fig. 4 shows, in developed view, the cylindrical surface of the commutator of the apparatus of Fig. 3;

Fig. 8 is a diagrammatical view of a modification of the apparatus of Fig. 5;

Figure 12:
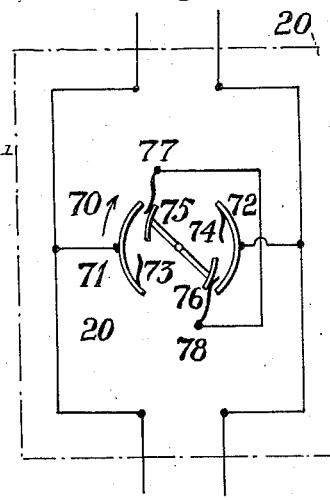

Fig. 9 similarly shows a simplification of the apparatus of Fig. 8;

Fig. 10 shows a practical embodiment of an apparatus according to Fig. 9;

Fig. 11 is a developed view of the cylindrical surface of the commutator of the apparatus of Fig. 10;

Fig. 12 is a diagrammatic view of an electrostatic amplifying device to be used in connection with my apparatus.

Fig. 13 diagrammatically illustrates the successive connections between elements of my apparatus, My invention is especially concerned with the measurement or checking of small potential differences, for instance for chemical analysis, industrial titrimetry (concentration measurements), electrochemical potential measurements, accuarte measurement of low potentials, and so on.

Up to the present time, these measurements were performed through apparatus of the kind diagrammatically illustrated by Fig. 1. The apparatus of Fig. 1 includes a potentiometric device including for instance a bridge arrangement, with a resistant and calibrated wire 1 connected to the terminals 2 and 3 of a direct current source 4. Terminal 2 is also connected to one of the central terminals, $5^1$, of a double throw switch 6, the other central terminal, $5^2$, of which is connected, through the interposition of a zero indicating apparatus 7 (galvanometer, electrometer, etc.) with a contact 8 slidable along wire 1. The movable arms of switch 6 can be applied either on contacts $9^1$, $9^2$ connected to the respective terminals of a standard source of electromotive force W or on contacts $11^1$, $11^2$, between which is applied the potential difference X to be measured, for instance that existing between two electrodes 12 and 13 extending into a solution contained in a vessel 14.

If N and N' are the positions of sliding contact 8 for which instrument 7 gives a zero reading when switch 6 is connected with contacts $9^1$—$9^2$ and $11^1$—$11^2$ respectively, the value of potential difference X is:

$$X = \frac{MN'}{MN}$$

In many cases, it is desired to measure a variable potential $x$. For instance, for potentiometric chemical titration of a solution present in vessel 14, the value to be measured is the difference between the reference potential of an electrode 12 and the potential of an electrode 13, variable as a reagent of known concentration is being introduced into vessel 14. In this case, a reference potential V is chosen and the measurement to be made is that of the difference $V-x$ between this reference potential and the variable potential $x$.

The known method above mentioned compels the operator to act on switch 6 and sliding contact 8 in addition to the operations he is to perform chemical volumetry (addition of reagent, stirring of the solutions in vessel 14, etc.). Furthermore, when it is necessary to make use, as electrode 13, of a glass electrode, which considerably increases the internal resistance of the cell, the method is of low sensitivity and an amplifier must be used, which further compels the operator to proceed to frequent readjustments.

All these drawbacks are avoided, according to the present invention, by causing the difference between a reference potential V (either fixed or adjustable) and the potential to be measured (either a fixed potential X or a variable potential $x$ the variations of which are to be followed) to charge a condenser, and subsequently discharging this condenser (possibly after amplification of the charge thereof, for instance through electrostatic means) into a measurement apparatus the indication of which permits of determining the momentary difference between the potential to be measured and the reference potential.

According to a feature of my invention, the various switching operations necessary for this purpose are automatically performed through suitable means, for instance a rotary switch operated at a suitable, but adjustable speed.

The apparatus shown by Figs. 2, 3 and 4 relate to the measurement of a constant potential difference.

The arrangement of Fig. 2 is analogous to that of Fig. 1, but the central terminal $5^2$ of switch 6, instead of being connected directly to apparatus 7, is connected, through a switch 15, to a condenser 16. This condenser can be caused, by means of a switch 17, to discharge into an indicator apparatus (for instance a galvanometer $7^1$ provided with its adjustable shunt winding 19).

According to a characteristic of my invention, if, for any reason (for instance because of the high resistance of the electrodes), the sensitiveness is too low, the charge of the condenser is first amplified through electrostatic means, for instance a Kelvin replenisher 20.

This apparatus (Fig. 12) includes two cylindrical parts 71 and 72, metallic and insulated, carrying metallic springs 73 and 74, said parts 71 and 72 being connected respectively both with the lower contacts of switch 15 and with the left hand side contacts of switch 17 (Fig. 2). Two metallic insulated pieces 75 and 76 are adapted to rotate about the common axis of pieces 71 and 72. After condenser 16 has been charged, and in order to multiply this charge, the arms of switch 15 are brought onto their lower contacts, and switch 17 is left open. Parts 75—76 are then rotated. When rotating in the direction of the arrow, "conveyers" 75 and 76 come into contact with two insulated springs 77 and 78, connected with each other; then they leave them before coming out from the zone of influence of "indicators" 71 and 72 connected with the terminals of measurement condenser 16. Finally they come into contact with springs 73 and 74 and the same cycle is repeated. The charge on armatures 71 and 72 increases as a geometrical progression.

Referring to Fig. 13, condenser 16 is therefore charged (a), disconnected (b), connected with electrostatic amplifier 20 (c) for amplification of its charge, discharged into galvanometer 7 (d), disconnected (e), short-circuited (f) then disconnected and again charged (a). All these operations are automatically controlled and the electrostatic amplifier 20 is mechanically driven.

Thus, condenser 16 is charged under the effect of the potential difference $e$ that corresponds to the adjustment displacement of the sliding contact 8 of potentiometer I effected for balancing the electric bridge device, and said condenser is subsequently discharged into galvanometer $7^1$. As long as $e$ is different from zero, this galvanometer is deflected. When there is no deflection in the galvanometer, the ratio of the potential that is measured to the standard potential W is equal to $$\frac{MN}{MN'}$$

This result is obtained in a very simple manner, without requiring special observations, adjustments or calculations.

Figs. 3 and 4 give an example of a practical construction of such an apparatus. In this embodiment of my invention, switches 15 and 17 are combined together into a rotary commutator 21 which cooperates with brushes $15^1$, $15^2$, $15^3$, and $17^1$, respectively connected to the various circuits.

Rotary commutator 21 is driven at an adjustable speed by a small electric motor 22 which may also operate amplifier 20.

Rotary commutator 21 is provided with several conductor strips (Fig. 4) mounted on an insulating support 23. Conductor strip 24, which runs along most of the periphery of the commutator, permits the charging of condenser 16, while the feed circuit of apparatus $7^1$ is short-circuited by strip 25. The discharging of condenser 16 is produced by strip 26, a portion $26^1$ of which short-circuits condenser 16 after the discharging thereof in order to eliminate the influence of residual charges. The operator has merely to adjust the position of sliding contact 8 along wire 1, while observing indicating apparatus $7^1$.

Owing to the fact that sensitiveness is to a large degree independent of the resistance between electrodes, the measurements can be performed with apparatus including glass electrodes, which are the only electrodes that can be used in certain mediums.

Figure 5:
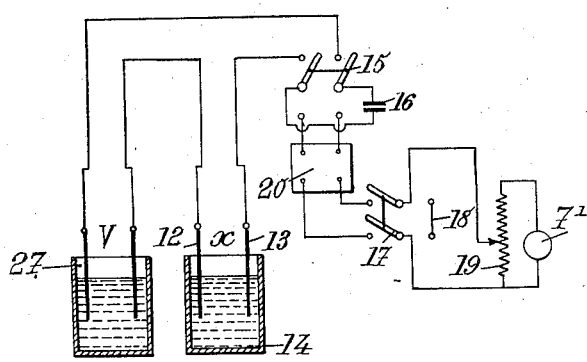
Fig. 5 is a diagrammatical view of an apparatus made according to the invention for checking the value of a variable potential difference $x$ with reference to a given potential difference V.
Figure 6:
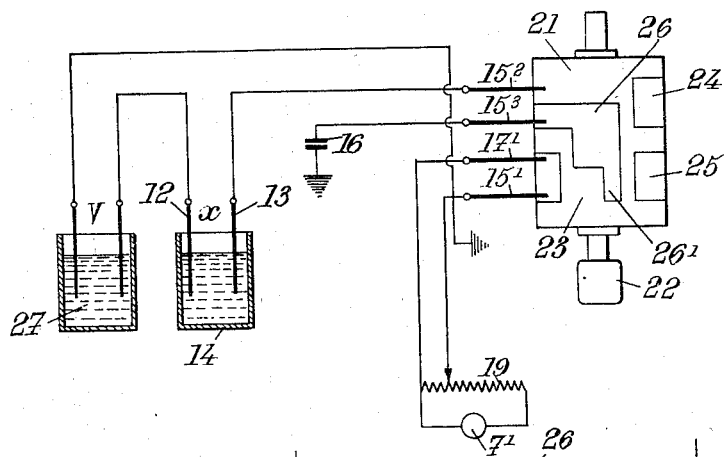
Fig. 6 shows a practical embodiment of an apparatus made on the principle disclosed by Fig. 5.
Figure 7:
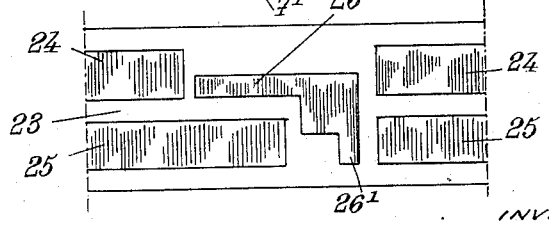
Fig. 7 is a developed view of the cylindrical surface of the commutator of the apparatus of Fig. 6.

The apparatus shown by Figs. 5 to 11 are intended for checking the difference between a variable potential and a fixed reference potential. In the important case of physico-chemical titrimetry, this given potential, which characterizes a given proportion of a reagent, may be obtained in various ways, for instance:

By the difference of potential between two points M and N of a wire 1 fed with current from a direct current source 4, in combination with an element 10 of fixed electromotive force W (Figs. 2 to 4);

By a suitable potential difference V across the terminals of a suitable battery (Figs. 5 to 7);

In a special manner which is to be hereinafter described, when the actual production of potential difference is likely to involve difficulties or lack of accuracy.

In the case of Figs. 5, 6 and 7, condenser 16 is charged and discharged in a manner analogous to that above described with reference to Figs. 2 to 4. But in this case, commutator 15 is fed with potential difference $V-x$, value V being materialized by a battery 27 including two electrodes extending in a suitable solution.

If difficulties or inaccuracy may result from the actual provision of means for producing potential V, it is advantageous to make use of arrangements such as disclosed by Figs. 8 to 11.

In this case, three electrodes 29, 30 and 31 are provided in vessel 14, which contains the solution to be treated and into which the reagent is introduced by means of a nozzle 28.

In the embodiment of Fig. 8, electrode 29 is constituted by a metal wire or strip immersed in a vessel closed at the bottom by a plug 32 of porous porcelain or fritted glass or by a leaking cock or by a capillary tube, this vessel containing a solution of ions of the same metal as the electrode, this solution being of a given, and for instance very low, concentration. Electrode 31 is constituted in a similar manner, but the concentration of the solution of ions is different from that chosen for electrode 29 and, for instance, equal to that of the reagent. Electrode 30, which, in this example, is of the same metal as electrodes 29 and 31, assumes, in the course of the titration operation, a potential intermediate between those of electrodes 29 and 31.

Instead of being independent, the three electrodes in question may be mechanically interconnected while being electrically insulated from one another and they may be mounted on an auxiliary support or on the wall of vessel 14.

I may also, as shown by Fig. 9, combine electrodes 29 and 31 with vessel 14¹ by providing the latter with two tubular extensions separated by porous partitions 32 from the central portion of said vessel, said electrodes 29 and 31 being partly immersed in solutions of different concentrations, as above stated, contained in these tubular extensions.

The three electrodes are respectively connected to the three upper terminals of a switch 6¹ the central terminals of which are respectively connected to two adjustable condensers 16¹ and 16², whereas the lower terminals of this switch are connected, in the manner shown by the drawing and through an amplifier 20 (not always necessary but which is advantageously constituted as above described with reference to Fig. 12), with the switch 17 of an indicator apparatus 7¹ (a galvanometer for instance). According to the position given to the movable element of switch 6¹ are successively charged, disconnected from each other, and reconnected in parallel with each other after reversing of one of them.

The final charge of the condenser equivalent to these two condensers 16¹ and 16² connected in parallel is equal to the difference between the charges initially imparted to these condensers under the effect of the respective differences of potential between 29 and 30 on the one hand and 30 and 31 on the other hand. The final difference of potential across the terminals of this equivalent condenser is a linear function of the potential of 30. According to the choice of the relative values of the capacities of these condensers 16¹ and 16², this difference of potential can be caused to become zero when the potential of 30 reaches the predetermined value V, thus specially constituting the reference potential V with the same accuracy as that with which the potentials of 29 and 30 are obtained.

Likewise, by operating switch 17, the feed circuit of galvanometer 7¹ is first shunted by a resistance equal to zero, then it is insulated and finally it can be connected to condensers 16¹ and 16², assembled in parallel, so as to permit the discharging thereof.

The arrangement of Fig. 9 may be simplified by connecting electrode 30 to the earth as shown by Fig. 9, so that it can be touched by the operator. This permits of utilizing a double switch 6² between electrodes 29, 30, 31 and condensers 16¹, 16², and a simple switch 17ᵃ for controlling apparatus 7¹. Reference numeral 20 designates an amplifier which may, if need be, be connected with condensers 16¹ and 16² during their coupling together.

Figs. 10 and 11 show a practical embodiment of an apparatus made on the principle illustrated by Fig. 9 and including a rotary commutator.

Fig. 10 diagrammatically shows the connections between brushes 33¹, 33², 33³, 33⁴, 33⁵, 33⁶ and condenser 16², electrode 31, electrode 29, condenser 16¹ and the two terminals of the indicator apparatus 7¹. These brushes cooperate as in the case of Figs. 3 and 6 with a rotary commutator 21 actuated by a small adjustable speed motor 22 and constituted by an insulating wall provided with conductor strips 34, 35, 36, 37 and 38.

When brushes 33¹, 33², 33³, 33⁴ are in contact with strips 34 and 35, condensers 16¹ and 16² are simultaneously charged. These condensers are subsequently coupled together and discharged into the circuit of galvanometer 7¹ by means of strips 37 and 38, which are interconnected.

I thus obtain an operation which is basically analogous to that of the apparatus shown by Figs. 2 to 7. However, it should be noted that for checking a variable potential difference, the apparatus of Figs. 5, 8 and 9 are particularly simple since they do not include a direct current source such as 4 nor an electric bridge with a wire such as 1. Only an alternating current source is necessary, for operating the motor 22 of rotary commutator 21. Such apparatus therefore introduce no special requirements except those inherent in chemical volumetry and it suffices, after having prepared electrodes 29 and 31 and adjusted the values of the capacities of condensers 16¹ and 16², to start rotary commutator 21 and to observe the indicator apparatus.

According to the speed of revolution of commutator 21, both for measuring and for checking the potential differences to be considered, I obtain, for a low rotation, a series of ballistic deflections which decrease before the point of equilibrium and increase beyond this point, the galvanometer or analogous indicator apparatus returning to zero between the impulses. On the contrary, for a quick rotation, I obtain a series of vibrations of the galvanometer about a deflection which first increases, until the point of equilibrium is reached and then decreases beyond this point. The amplitudes of these vibrations are the lower as the inertia of the galvanometer is greater. The deflection of the galvanometer also becomes zero at the desired point.

The rate of addition of the reagent into vessel 14 depends upon the speed to be obtained in the titration. It may be great at the beginning of the titration and slow near the presumed end thereof. The flow rate of the reagent is not imposed.

Owing to the fact that sensitiveness is mostly independent of the resistance between electrodes, titration can be effected with glass electrodes, which are the only electrodes that can be utilized in certain liquids. When the circuits have a high resistance, the charging of the condensers may be slow, but if it is incomplete, the accuracy of the measurement remains unchanged, although the sensitiveness is reduced.

As the values of the capacities of the condensers can be modified (even during the operation), it is possible to vary the sensitiveness of the whole and the method and apparatus according to the invention can be applied to the general treatment of a solution containing several different ions adapted to be acted upon by the same reagent, as this is the case, for instance, for a solution containing several halogen ions (Cl, Br, I) which can be precipitated by a reagent such as a salt of silver.

It should also be noted that the apparatus according to the present invention give stable and accurate measurements under all circumstances in view of the fact that they remain uninfluenced by perturbing actions such as an irregular diffusion of the reagent in vessel 14, an incomplete stirring obtained either by hand or by means of an auxiliary stirring means, which may be constituted by electrode 30 itself, etc.

The methods and apparatus according to my invention are well adapted for potentiometric chemical titrations for measuring ionic concentrations, either constant or variable by addition of a reagent in matters which may be either mineral or organic, either liquid or viscous, either good or bad conductors of electricity, in an oxidizing or reducing medium, either colored or not. They can also be applied to the measurement of an oxide reducing power, of a pH, for checking the quality of manufactured products, either on samples or in a continuous manner, for chemical separations or for adjusting concentrations inside given potential limits. Furthermore, when the rotary commutator is driven at high speed, the indications given by galvanometer $7^1$ or any analogous apparatus can be recorded. On the other hand, these indications may be used for controlling relays for exerting any mechanical, electric or other action, either externally to the chemical system that is considered or inside this system (for instance for stopping the flow of reagent when the direction of deflection of the galvanometer tends to be reversed), or for operating luminous or sound electric signalling means.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A titrimeter which comprises, in combination, a main vessel adapted to contain the solution to be studied, an electrode in said vessel adapted to dip in this solution, two auxiliary half cells in capillary communication with said first mentioned vessel, two adjustable condensers, means for charging each of said condensers with the difference of potential between each auxiliary half-cell electrode, respectively and the first mentioned electrode, means for disconnecting said condensers from said electrodes, means for coupling said condensers together in series, an electrical measurement indicator, and means for discharging the whole of said two condensers thus coupled together into said indicator.

2. A titrimeter which comprises, in combination, a main vessel adapted to contain the solution to be studied, an electrode in said vessel adapted to dip in this solution, two auxiliary half cells in capillary communication with said first mentioned vessel, two adjustable condensers, means for temporarily connecting the armatures of each of said condensers with one of the auxiliary half cell electrodes and the first mentioned electrode respectively and subsequently disconnecting said condensers from said electrodes, means for coupling said condensers together in series, an electrical measurement indicator, and means for discharging the whole of said two condensers thus coupled together into said indicator.

3. A titrimeter which comprises, in combination, a main vessel adapted to contain the solution to be studied, an electrode in said vessel adapted to dip in this solution, two auxiliary half cells in capillary communication with said first mentioned vessel, two condensers, switch means for either temporarily connecting said electrode with the two corresponding respective armatures of the condensers and the two half cell electrodes with the remaining armatures or coupling said condensers together in series, an electrical measurement indicator, and switch means for discharging the whole of said two condensers thus coupled together into said indicator.

4. A titrimeter which comprises, in combination, a main vessel adapted to contain the solution to be studied, an electrode in said vessel adapted to dip in this solution, two auxiliary half cells in capillary communication with said first mentioned vessel, two condensers, switch means for either temporarily connecting said electrode with the two corresponding respective armatures of the condensers and the two half cell electrodes with the remaining armatures or coupling said condensers together in series, an electrical measurement indicator, switch means for discharging the whole of said two condensers thus coupled together into said indicator, and automatic means for successively and repeatedly operating said two switch means.

5. A titrimeter which comprises, in combination, a main vessel adapted to contain the solution to be studied, an electrode in said vessel adapted to dip in this solution, two auxiliary half-cells in capillary communication with said first mentioned vessel, two adjustable condensers, means for charging each of said condensers with the difference of potential between each auxiliary half-cell electrode, respectively, and the first mentioned electrode, means for disconnecting said condensers from said electrodes, means for coupling said condensers together in series, an electrical measurement indicator, means for discharging the whole of said two condensers thus coupled together into said indicator and means for short circuiting said group of condensers.

6. A titrimeter according to claim 1 further including electrostatic means for multiplying the charge on the whole of said two condensers after their coupling together in series and prior to the discharging of the whole thereof into said indicator.

EMMANUEL LÉON GAMBETTA.

REFERENCES CITED

The following references are of record in the file of this patent:

UNITED STATES PATENTS

| Number | Name | Date |
|---|---|---|
| 1,346,057 | Reardon | July 6, 1920 |
| 2,285,482 | Wunsch | June 9, 1942 |
| 2,361,295 | Kanner et al. | Oct. 24, 1944 |
| 2,416,949 | Perley et al. | Mar. 4, 1947 |